3,677,740
PROCESS OF BENEFICIATING TITANIFEROUS
BEACH SAND
Frank Ronald Williams, Yarm, Jack Whitehead, Acklam, Jefferson Marshall, Stockton-on-Tees, Alan Conners, Balcombe, and Derek Vernon Gosden, Horsham, England, assignors to British Titan Products Company Limited, Billingham, Teesside, England
No Drawing. Filed July 31, 1970, Ser. No. 60,128
Claims priority, application Great Britain, July 31, 1964, 38,476/64
Int. Cl. C21b 1/00; C22b 1/00
U.S. Cl. 75—1                    16 Claims

ABSTRACT OF THE DISCLOSURE

A process for the beneficiation of iron-containing titaniferous material suitable for attack by sulphuric acid in which a beach sand ilmenite is oxidised at a temperature in the range 700° C. to 800° C. and the iron content is thereafter reduced at an elevated temperature to a ferrous state before leaching the material with aqueous hydrochloric acid to produce a material, when dry, containing between 75% and 90% of titanium, expressed as $TiO_2$.

---

The present invention relates to a process for the production of a beneficiated titaniferous material which has a high solubility in concentrated sulphuric acid from an iron-containing titaniferous beach sand ilmenite.

Titaniferous material which has been derived from iron-containing titaniferous beach sand ilmenite by beneficiation is of value since it can be chlorinated to titanium tetrachloride without substantial loss of chlorine in the form of ferric chloride. The titanium tetrachloride can then be oxidised, for example in the vapour phase, to valuable pigmentary titanium dioxide.

It would be a great advantage if the process of beneficiation could then be operated to produce starting material suitable for use in either the so-called "chloride" or "sulphate" processes for the production of pigmentary titanium dioxide.

Hitherto, it has proved difficult to produce a beneficiated titaniferous material having an acceptably high solubility in concentrated sulphuric acid.

It is an object of the present invention to provide a process for the production of such material.

Accordingly, the present invention is a process for the production of a beneficiated titaniferous material soluble in concentrated sulphuric acid which comprises oxidising a particulate iron-containing titaniferous beach sand ilmenite at a temperature in the range 700° C. to 800° C. to convert the iron content to the ferric state, reducing the iron content of the product at an elevated temperature substantially wholly to the ferrous state, leaching the material with aqueous hydrochloric acid until the material, when dry, contains between 75% and 90% of titanium, expressed as $TiO_2$, and thereafter recovering solid material soluble in concentrated sulphuric acid.

By the term "soluble in concentrated sulphuric acid" is meant a material which contains not more than 2% and preferably not more than 1% by weight of its titanium content (expressed as $TiO_2$) which is insoluble, after boiling for 2 hours in 70% sulphuric acid (by weight).

A particulate iron-containing titaniferous beach sand is finely-divided ilmenite, normally containing between 30% and 46% by weight of iron (expressed as FeO).

It is preferred that the material shall have an average means weight particle size in the range $50\mu$ to $300\mu$ and particularly one in the range $50\mu$ to $200\mu$.

The iron-containing titaniferous material may be oxidised at a temperature in the range 700° C. to 800° C. in any suitable manner but it is preferred to do this by heating the material in an oxidising atmosphere such as air in a fluidised bed or in a rotating kiln. The heating should be continued until substantially all the iron content is oxidised, for example until at least 95% of the iron content is in the ferric state.

It has been found that heating the material under oxidising conditions at temperatures in excess of about 800° C. sharply increases the proportion of titaniferous material which is insoluble in concentrated sulphuric acid and heating below 700° C. gives inadequate oxidation and/or requires an unacceptably long period for a satisfactory degree of oxidation.

The oxidised material is then subjected to reduction at an elevated temperature until substantially all the iron is reduced to the ferrous state. The reduced product should preferably contain not more than 2% by weight of its iron content in a form other than the ferrous state.

One very convenient way of carrying out the reduction is in a fluidised bed by the use of a reducing gas, for example hydrogen (which may contain a minor proportion of steam) or a gaseous hydrocarbon containing from 1 to 4 carbon atoms, particularly methane, as described in our copending applications Ser. No. 60,124, filed July 31, 1970 and Ser. No. 60,119 filed July 31, 1970 or carbon monoxide or by a solid reductant such as carbon.

The reduction is preferably carried out at a temperature in the range 650° C. to 850° C. and particularly at a temperature in the range 700° C. to 800° C. since reducing at temperatures in excess of these may also cause a decrease in the solubility of the titanium under the conditions of the test.

By first oxidising and then reducing the iron content it has been found that the iron is more reactive to, and more readily extracted by, aqueous hydrochloric acid during the subsequent leaching step. Furthermore, the iron content forms a solution of ferrous chloride which is particularly suitable for conversion to finely divided iron powder via the reduction of solid ferrous chloride dehydrate or to finely divided iron oxide. Furthermore, the hydrochloric acid can be recovered, for example, by the use of the Aman process described in British specification 793,700.

After reduction the iron-containing titaniferous material is contacted with aqueous hydrochloric acid to leach out the required amount of iron.

Leaching is preferably carried out at a temperature in the range 80° C. to the boiling point of the acid using a 20% to 30% stoichiometric excess of the acid (based on the iron content).

Aqueous hydrochloric acid containing from 18% to 22% of HCl by weight is preferred and the material may be agitated, during leaching, by passing an inert gas such as nitrogen through the suspension. One convenient method of contacting the solid and acid is by recirculating the acid upwardly through a bed of the solid material. The best results have been obtained by leaching in two stages in the first of which may be used hydrochloric acid which has been used to leach a previous batch of iron-containing titaniferous material. The second stage leach may then be carried out using fresh acid which may subsequently be re-used in a first stage leach of a later batch of the material as described, for example, in our copending application.

It has been found that the iron-containing titaniferous material contacted with the aqueous hydrochloric acid for a period in the range 30 minutes to 90 minutes and preferably for one in the range 30 minutes to 60 minutes normally has a titanium content in the required range.

Periods longer than 90 minutes may cause a significant increase in the amount of titaniferous material which is insoluble in concentrated sulphuric acid and periods less than 30 minutes may give rise to inadequate removal of the iron.

The titanium content (expressed as $TiO_2$) of the leached material, after drying, should be in the range 75% to 90% and preferably in the range 75% to 85% by weight.

Iron-containing titaniferous material treated by the process of the present invention is very suitable for digestion with concentrated sulphuric acid under the well-known conditions of the so-called "sulphate" process to produce a digestion cake which can be subsequently dissolved to form an aqueous solution of titanium sulphate. This, in turn, can be thermally hydrolysed to form hydrous titanium dioxide (after seeding, if desired) which, after calcination, forms pigmentary titanium dioxide.

The following example illustrates the present invention:

EXAMPLE

One kilogram quantities of an ilmenite containing 24% of *ferrous* iron (estimated as FeO) was fluidised with air in 3 inch diameter bed at the temperature shown. The air flow rate was 10 litres/minute.

Samples were taken from the beds at the times noted and the ferrous iron content estimated.

The results obtained are given in Table 1 below:

TABLE 1

| Temp. °C. | Percent FeO after— | | | | | | | | | |
|---|---|---|---|---|---|---|---|---|---|---|
|  | 0.5 hr. | 1.0 hr. | 1.5 hr. | 2.0 hr. | 2.5 hr. | 3.0 hr. | 3.5 hr. | 4.0 hr. | 4.5 hr. | 5.25 hr. |
| 600 |  |  |  |  | 15.0 | 15.5 | 14.8 | 14.6 |  |  |
| 650 |  |  | 13.3 | 12.6 | 12.3 | 11.9 | 11.9 |  |  |  |
| 700 | 12.1 | 10.6 | 9.0 | 7.6 | 7.7 | 6.8 | 5.0 | 3.8 | 3.7 | 1.4 |
| 750 | 10.2 | 7.4 | 4.8 | 3.1 | 1.9 | 1.6 |  |  |  |  |
| 800 | 2.3 | 1.1 | 0.7 | 0 |  |  |  |  |  |  |
| 850 | 2.4 | 0.4 | 0 |  |  |  |  |  |  |  |
| 900 | 0.6 | 0 |  |  |  |  |  |  |  |  |

It can be seen that at temperatures below 700° C. the rate of oxidation is unacceptably slow.

Equal quantities of the products oxidised at temperatures of 700° C. and above were reduced in 1 inch diameter beds fluidised with hydrogen at a flow rate of 3 litres/minute until reduction to the ferrous state was complete. The beds were maintained at a temperature of 700° C. during reduction. The products were then analysed for ferrous iron and the results given in Table 2.

The reduced materials were leached with constant boiling (at atmospheric pressure) aqueous hydrochloric acid for 90 minutes using a 20% stoichiometric excess of hydrochloric acid (based on the iron content of the material) and with agitation by passing nitrogen through the suspension and a portion of each material was digested with 70% (by weight) sulphuric acid at the boiling point of the acid for 2 hours. The percentages (expressed as $TiO_2$) of unattacked titaniferous material and that dissolved were estimated and the results are shown in Table 2 below.

TABLE 2

| Oxidation temp., °C. | Reduction stage, percent FeO | Product analysis | |
|---|---|---|---|
|  |  | Percent U/$TiO_2$* | Percent $TiO_2$ |
| 700 | 40.3 | 2.3 | 90.1 |
| 750 | 40.6 | 2.0 | 91.5 |
| 800 | 39.5 | 3.4 | 90.4 |
| 850 | 39.8 | 7.65 | 91.2 |
| 900 | 41.3 | 9.4 | 91.5 |

*U/$TiO_2$=unattacked $TiO_2$.

These results show the sharp increase in titaniferous material which is insoluble in sulphuric acid under the test conditions when the material is oxidised at temperatures above 800° C.

Material which was reduced at 700° C. after having been previously oxidised at 700° C., 800° C. and 900° C. was leached with constant boiling point aqueous hydrochloric acid in 20% stoichiometric excess (based on the iron content of the material) at the boiling point of the acid for 90 minutes. The materials were sampled after 30 minutes' leaching and at the end of the leach period and these samples and the final products were digested with sulphuric acid as described above.

The results obtained are shown in Table 3 below:

TABLE 3

| | Product analysis | | | |
|---|---|---|---|---|
| | Percent U/$TiO_2$* after— | | Percent $TiO_2$ after— | |
| Oxidation temperature, °C. | 0.5 hr. | 1.5 hr. | 0.5 hr. | 1.5 hr. |
| 700 | 0.9 | 2.3 | 78.2 | 90.0 |
| 800 | 1.4 | 3.4 | 81.7 | 90.0 |
| 900 | 2.8 | 9.4 | 87.9 | 91.5 |

*U/$TiO_2$=unattacked $TiO_2$.

These results show that leached materials containing more than 90% by weight of titanium (expressed a $TiO_2$) gives an unacceptably high proportion of unattackable titaniferous material and that leaching for periods in excess of 90 minutes also tends to give an unacceptably high proportion of titaniferous material which is insoluble in concentrated sulphuric caid. This feature is particularly marked where oxidation temperatures in excess of 800° C. are used.

Leached material containing between 75% and 85% of titanium, expressed as $TiO_2$, are particularly readily digested with sulphuric acid.

The conditions of digestion with concentrated sulphuric acid (i.e. using 70% by weight acid for 2 hours at a temperature of the boiling point of the acid) were chosen to approximate as closely as possible to the digestion conditions which it is desired to use in the "sulphate" process for the production of pigmentary $TiO_2$.

What is claimed is:

1. A process for the production of beneficiated titaniferous material soluble in concentrated sulphuric acid comprising oxidizing a particulate iron-containing titaniferous beach sand ilmenite at a temperature in the range 700° C. to 800° C. to convert the iron content to the ferric state, reducing the iron content at an elevated temperature substantially wholly to the ferrous state, leaching the material with aqueous hydrochloric acid until, when dry, it contains between 75% and 90% by weight of titanium, expressed as $TiO_2$ and thereafter recovering solid titaniferous material soluble in concentrated sulphuric acid, said soluble titaniferous material containing not more than 2% by weight of its titanium content (expressed as $TiO_2$) which is insoluble, after boiling for 2 hours in 70% sulphuric acid (by weight).

2. A process as claimed in claim 1 wherein the ilmenite contains between 30% and 46% iron by weight of iron (expressed as FeO).

3. A process as claimed in claim 1 wherein the ilmenite has an average mean weight particle size in the range $50\mu$ to $300\mu$.

4. A process as claimed in claim 3 wherein the particle size is in the range $50\mu$ to $200\mu$.

5. A process as claimed in claim 1 wherein the ilmenite is oxidised until at least 95% of the iron content is in the ferric state.

6. A process as claimed in claim 1 wherein the oxidised ilmenite is heated to a temperature in the range 650° C. to 850° C. during reduction.

7. A process as claimed in claim 6 wherein the oxidised ilmenite is heated to a temperature in the range 700° C. to 800° C. during reduction.

8. A process as claimed in claim 1 wherein the reduced ilmenite is leached with aqueous hydrochloric acid at a temperature in the range 80° C. to the boiling point of the acid.

9. A process as claimed in claim 1 wherein the reduced material is leached with a 20% to 30% stoichiometric excess of hydrochloric acid, based on the iron content of the material.

10. A process as claimed in claim 1 wherein the hydrochloric acid contains from 18% to 22% HCl.

11. A process as claimed in claim 1 wherein the reduced ilmenite is agitated, during leaching, by passing an inert gas through the suspension.

12. A process as claimed in claim 1 wherein the reduced ilmenite is contacted with hydrochloric acid by passing the acid upwardly through a bed of the material.

13. A process as claimed in claim 1 wherein the leaching is carried out in two stages in the first of which is used hydrochloric acid previously used for leaching reduced ilmenite and in the second stage is used fresh acid.

14. A process as claimed in claim 1 wherein the reduced ilmenite is leached for a period of from 30 to 90 minutes.

15. A process as claimed in claim 14 wherein the reduced ilmenite is leached for a period of from 30 to 60 minutes.

16. A process as claimed in claim 1 wherein the leached material, after drying, contains between 75% and 85% by weight of titanium, expressed as $TiO_2$.

References Cited

UNITED STATES PATENTS

| | | | |
|---|---|---|---|
| 1,196,049 | 8/1916 | Von Rauschenplat | 75—1 |
| 2,183,365 | 12/1939 | Booge | 75—1 X |
| 2,256,536 | 9/1941 | Udy | 75—1 |
| 2,752,301 | 6/1956 | Cooper | 75—1 X |
| 2,758,019 | 8/1956 | Daubenspeck et al. | 75—1 |
| 3,105,755 | 10/1963 | Green | 75—1 |
| 3,193,376 | 7/1965 | Lo et al. | 75—114 X |
| 3,457,037 | 7/1969 | Aramendia et al. | 75—101 RX |
| 3,597,189 | 8/1971 | Sinha et al. | 75—1 |

ALLEN B. CURTIS, Primary Examiner

U.S. Cl. X.R.

75—101, 114